United States Patent
Philips et al.

(10) Patent No.: US 7,945,782 B2
(45) Date of Patent: *May 17, 2011

(54) METHOD AND APPARATUS FOR DIGITALLY SIGNING ELECTRONIC MAIL THAT ORIGINATES FROM A BROWSER

(75) Inventors: Andrew B. Philips, San Francisco, CA (US); Ramana Rao Turlapati, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/198,725

(22) Filed: Aug. 26, 2008

(65) Prior Publication Data
US 2008/0313466 A1 Dec. 18, 2008

Related U.S. Application Data

(63) Continuation of application No. 10/405,431, filed on Apr. 1, 2003, now Pat. No. 7,437,562.

(51) Int. Cl.
*H04L 9/00* (2006.01)
(52) U.S. Cl. ........ 713/176; 713/152; 713/153; 709/206; 709/207

(58) Field of Classification Search .................. None
See application file for complete search history.

(56) References Cited

U.S. PATENT DOCUMENTS

| 6,161,181 | A | * | 12/2000 | Haynes et al. | 713/170 |
| 7,043,456 | B2 | * | 5/2006 | Lindskog et al. | 705/76 |
| 7,203,838 | B1 | * | 4/2007 | Glazer et al. | 713/176 |
| 2007/0022295 | A1 | * | 1/2007 | Little et al. | 713/176 |

* cited by examiner

*Primary Examiner* — Nasser Moazzami
*Assistant Examiner* — Fikremariam Yalew
(74) *Attorney, Agent, or Firm* — Park, Vaughan, Fleming & Dowler LLP; Shun Yao

(57) ABSTRACT

One embodiment of the present invention provides a system for digitally signing electronic mail that originates from a browser. The system operates by first receiving a message from a browser at a mail server. The mail server formats the message and returns the formatted message to the browser so that the browser can sign the message. The mail server then receives the signature for the formatted message from the browser and encapsulates the formatted message and the signature into a secure message. Next, the mail server forwards the secure message to the intended recipients for the message.

18 Claims, 3 Drawing Sheets

METHOD AND APPARATUS FOR DIGITALLY SIGNING ELECTRONIC MAIL THAT ORIGINATES FROM A BROWSER

RELATED APPLICATION

This application is a continuation of and hereby claims priority under 35 U.S.C. §120 to prior application Ser. No. 10/405,431, entitled "Method and Apparatus for Digitally Signing Electronic Mail that Originates from a Browser," by inventors Andrew B. Philips and Ramana Rao turlapati, filed 1 Apr. 2003.

BACKGROUND

1. Field of the Invention

The present invention relates to electronic mail. More specifically, the present invention relates to a method and an apparatus for digitally signing electronic mail that originates from a web browser.

2. Related Art

In addition to providing an effective means of communication, people are beginning to use electronic mail for other purposes, such as consummating business transactions. To provide an effective medium for business transactions, electronic mail needs to be signed in a manner that makes it possible to verify the source of the electronic mail and that facilitates non-repudiation of electronic mail messages.

Existing applications that send and receive electronic mail sometimes include cryptographic processes for embedding digital signatures within the email message. These applications typically use a mail format known as Secure Multipurpose Internet Mail Extensions (S/MIME) to encapsulate a number of items including, the message, addressing information, digital signatures, and other information related to the electronic mail message. While this system works well when the electronic messages originate from and are delivered to electronic mail applications, there are many situations in which generating an S/MIME formatted message is not possible or presents security problems.

Problems can arise while accessing electronic mail from a remote location, because such access may be prohibited by corporate firewalls or may be restricted by other means. In these cases, users can retrieve their electronic mail from a web mail server through a web browser. While a web browser can access the web mail server to perform a number of functions, such as displaying messages, replying to messages, and initiating new messages, existing web browsers do not have the capability to create an S/MIME formatted message. The web mail server typically formats and deformats electronic mail messages for the web browser using the Multipurpose Internet Mail Extensions (MIME) standard.

A web mail server can be programmed to generate S/MIME messages. However, this creates security problems. In order for the web mail server to be able to sign the message, the web mail server needs to know the signer's private key. If the signer's private key is available to an application such as the web mail server, the signature cannot be traced reliably to the user. Therefore, the user can deny signing a message and there would be no proof to indicate otherwise.

Hence, what is needed is a method and an apparatus for digitally signing browser electronic mail without the problems described above.

SUMMARY

One embodiment of the present invention provides a system for digitally signing electronic mail that originates from a browser. The system operates by first receiving a message from a browser at a mail server. The mail server formats the message and returns the formatted message to the browser so that the browser can sign the message. The mail server then receives the signature for the formatted message from the browser and encapsulates the formatted message and the signature into a secure message. Next, the mail server forwards the secure message to the intended recipients for the message.

In a variation of this embodiment, the browser signs the message using a private key that is part of a private key/public key pair.

In a further variation, the browser signs the message using public key cryptography standard seven (PKCS7).

In a further variation, the mail server forwards the secure message to a standard mail server, which can include a simple mail transfer protocol (SMTP) server or an Internet mail access protocol (IMAP) server. The standard mail server recognizes the secure message as valid.

In a further variation, the message format includes a Multipurpose Internet Mail Extensions (MIME) format and the secure message includes a Secure MIME (S/MIME) format.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device that can store code and/or data for use by a computer system. This includes, but is not limited to, magnetic and optical storage devices such as disk drives, magnetic tape, CDs (compact discs) and DVDs (digital versatile discs or digital video discs).

Computer Systems

Figure 1:
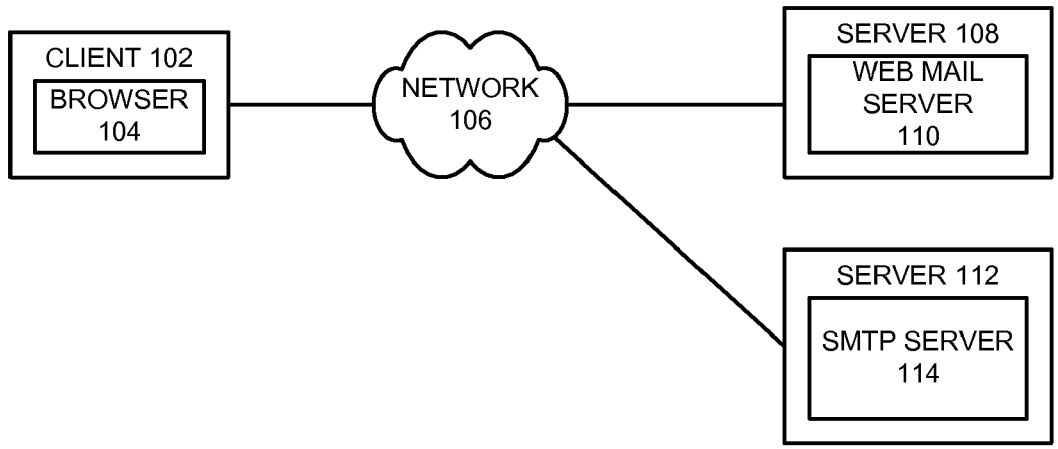
FIG. 1 illustrates computer systems coupled together in accordance with an embodiment of the present invention.

FIG. 1 illustrates computer systems coupled together in accordance with an embodiment of the present invention. Client 102 and servers 108 and 112 are coupled to and communicate across network 106. Client 102 can generally include any node on a network including computational capability and including a mechanism for communicating across network 106. Client 102 includes browser 104. Browser 104 can generally include any type of web browser capable of viewing a web site, such as the INTERNET EXPLORER™ browser distributed by the Microsoft Corporation of Redmond, Wash.

Servers 108 and 112 can generally include any nodes on a computer network including a mechanism for servicing requests from a client for computational and/or data storage resources. Server 108 includes web mail server 110 and server 112 includes SMTP server 114.

Network 106 can generally include any type of wire or wireless communication channel capable of coupling together computing nodes. This includes, but is not limited to, a local area network, a wide area network, or a combination of networks. In one embodiment of the present invention, network 106 includes the Internet.

During operation, browser 104 generates an electronic mail message to be digitally signed and sent to a recipient that uses SMTP server 114. Browser 104 sends the electronic mail message and a signature request to web mail server 110 specifying that the message is to be formatted as a Secure Multipurpose Internet Mail Extensions (S/MIME) message.

In response, web mail server 110 formats the message, including source address, destination addresses, and other data in a MIME format to be digitally signed. Web mail server 110 then returns the message in MIME format back to browser 104 for a digital signature. Note that returning the MIME format message to browser 104 for signature allows client 102 to maintain control over the cryptographic keys used to form the signature while web mail server 110 ensures that the electronic mail message is properly formatted. Also note that browser 104 does not include the means for formatting the message.

After browser 104 has signed the message, the signature is returned to web mail server 110 to be added to the MIME formatted message to create an S/MIME formatted message. This S/MIME formatted message is then sent to SMTP server 114 for delivery to the recipient. Note that the S/MIME formatted message is indistinguishable from an S/MIME message created by a normal SMTP server. Also note that an Internet mail access protocol (IMAP) server can be used in place of the SMTP server.

Web Mail Server

Figure 2:
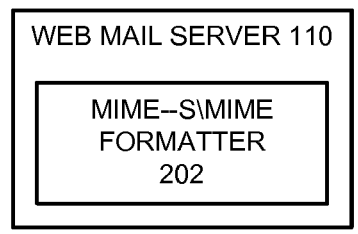
FIG. 2 illustrates web mail server 110 in accordance with an embodiment of the present invention.

FIG. 2 illustrates web mail server 110 in accordance with an embodiment of the present invention. Web mail server 110 includes MIME-S/MIME formatter 202. During operation, MIME-S/MIME formatter 202 receives an electronic mail message, including header information, from browser 104. In response, MIME-S/MIME formatter 202 formats the electronic mail message into a MIME format and returns the formatted message to browser 104. After browser 104 returns the signature for the formatted message, MIME-S/MIME formatter 202 formats the MIME message and signature as an S/MIME message. This S/MIME message is indistinguishable from an S/MIME message generated by a normal SMTP server or a normal IMAP server.

Browser

Figure 3:
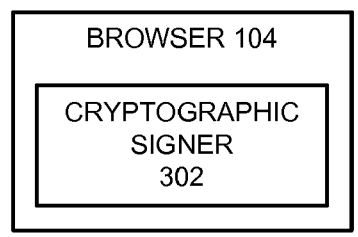
FIG. 3 illustrates browser 104 in accordance with an embodiment of the present invention.

FIG. 3 illustrates browser 104 in accordance with an embodiment of the present invention. Browser 104 includes cryptographic signer 302. Cryptographic signer 302 digitally signs MIME messages formatted for signature and returned by MIME-S/MIME formatter 202. Cryptographic signer 302 typically uses a private key belonging to a user of client 102 to digitally sign the MIME message. The user's public key can then be used by message recipients to prove that the user signed the MIME message. In one embodiment of the present invention, cryptographic signer 302 uses public key cryptography standard seven (PKCS7) to sign the electronic mail message.

Message Flow

Figure 4:
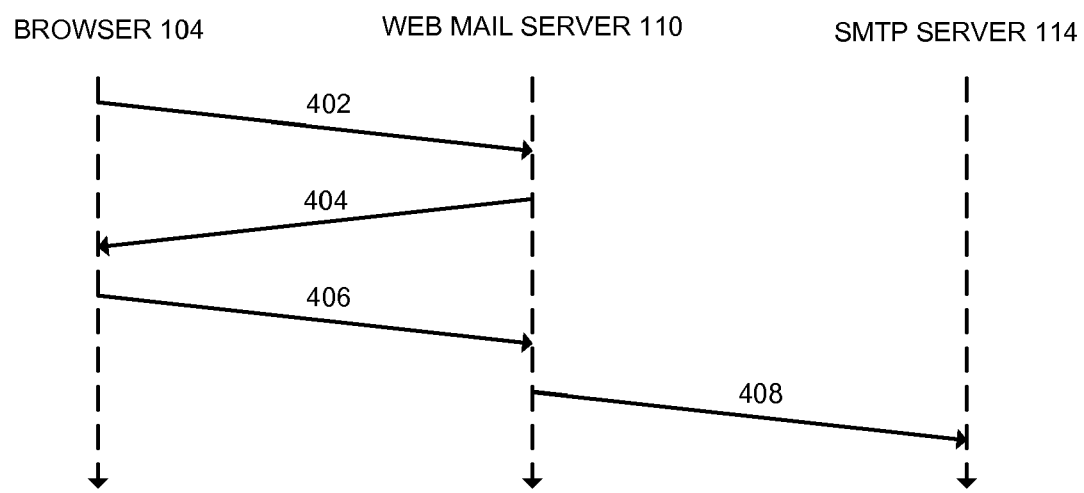
FIG. 4 presents an activity diagram illustrating message flow in accordance with an embodiment of the present invention.

FIG. 4 presents an activity diagram illustrating message flow in accordance with an embodiment of the present invention. Browser 104 generates electronic mail message 402 and sends electronic mail message 402 to web mail server 110. Web mail server 110 formats electronic mail message 402 into MIME message 404 and returns MIME message 404 to browser 104.

Next, browser 104 signs the MIME message and returns signature 406 to web mail server 110. Web mail server 110 then formats the MIME message and signature 406 as S/MIME message 408 and forwards S/MIME message 408 to SMTP server 114 for delivery to the intended recipients for the message.

Digitally Signing Browser Electronic Mail

Figure 5:
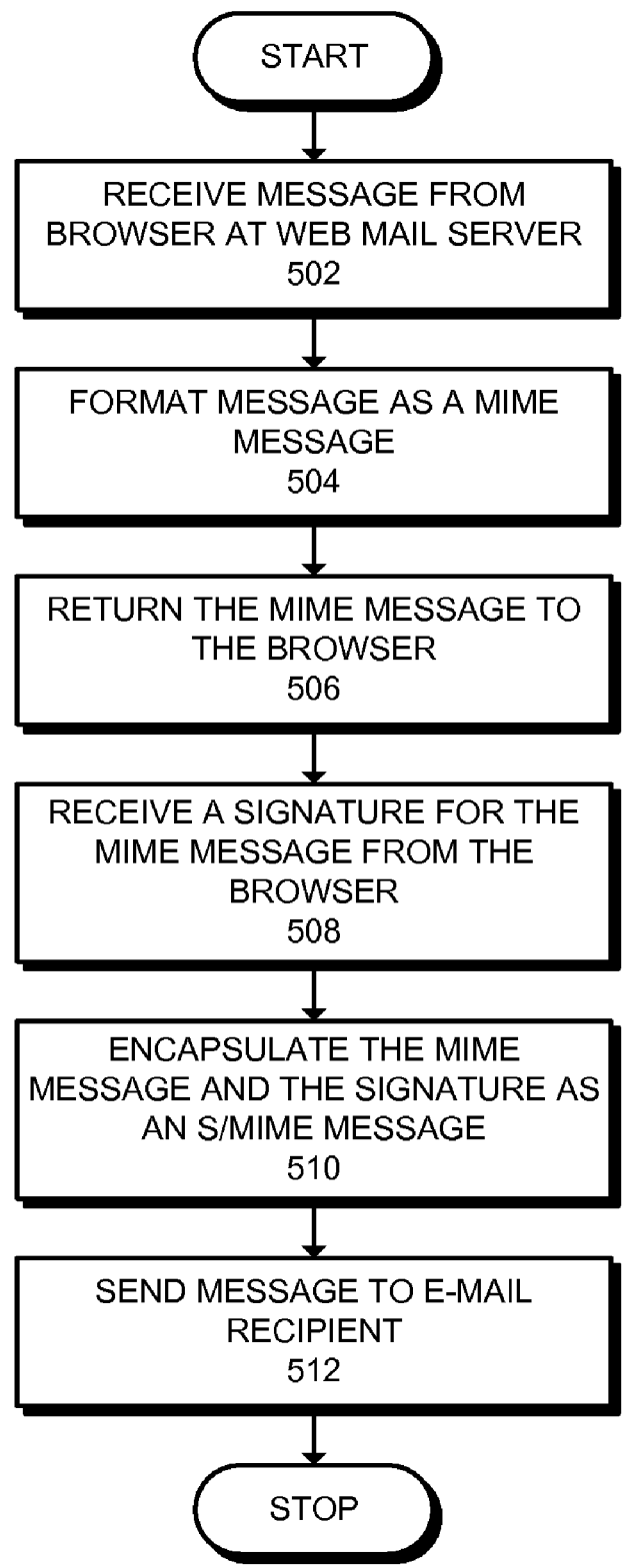
FIG. 5 presents a flowchart illustrating the process of digitally signing browser electronic mail in accordance with an embodiment of the present invention.

FIG. 5 presents a flowchart illustrating the process of digitally signing browser electronic mail in accordance with an embodiment of the present invention. The system starts when the web mail server receives an electronic mail message from a browser (step 502). Next, the system formats the message as a MIME message (step 504). After formatting the message as a MIME message, the system returns the MIME message to the browser for signature (step 506). Note that for simple electronic mail messages (no attachments, not encrypted, etc.), one embodiment of the present invention allows formatting the message as a MIME message at the browser. In this case, steps 502 and 506 are not necessary and step 504 is executed at the browser.

In response to returning the MIME message to the browser, the web mail server receives a signature for the MIME message from the browser (step 508). Next, the system encapsulates the MIME message and the signature as an S/MIME message (step 510). Finally, the system sends the S/MIME message to the recipient (step 512).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for digitally signing electronic mail that originates from a web browser, comprising:

receiving, at a server computer, content for an electronic mail from the web browser of a client;

formatting the unsigned electronic mail by the server computer to a format that can be digitally signed by the web browser;

returning the unsigned electronic mail formatted to be digitally signed to the web browser, whereby a digital signature for the formatted unsigned electronic mail is generated by the web browser;

receiving, at the server computer, the digital signature generated by the web browser for the formatted unsigned electronic mail;

encapsulating, at the server computer, the formatted unsigned electronic mail and the digital signature as a digitally signed secure electronic mail; and forwarding the digitally signed secure electronic mail to an intended recipient.

2. The method of claim 1, wherein the digital signature is generated based on public key cryptography.

3. The method of claim 2, wherein the digital signature is generated based on public key cryptography standard seven (PKCS7).

4. The method of claim 1, wherein forwarding the secure electronic mail to the intended recipient comprises sending the secure electronic mail to a mail server, wherein the mail server includes at least one of a simple mail transfer protocol (SMTP) server and an Internet mail access protocol (IMAP) server, and whereby the mail server recognizes the secure electronic mail as valid.

5. The method of claim 1,
wherein the electronic mail format that can be digitally signed is a Multipurpose Internet Mail Extensions (MIME) format; and
wherein the secure electronic mail is based on a Secure MIME (S/MIME) format.

6. A computer-readable storage device storing instructions that when executed by a computer cause the computer to perform a method for digitally signing electronic mail that originates from a web browser, the method comprising:
receiving content for an unsigned electronic mail from the web browser of a client;
formatting the unsigned electronic mail to a format that can be digitally signed by the web browser;
returning the unsigned electronic mail formatted to be digitally signed to the web browser, whereby a digital signature for the formatted unsigned electronic mail is generated by the web browser;
receiving the digital signature generated by the web browser for the formatted unsigned electronic mail;
encapsulating the formatted unsigned electronic mail and the digital signature as a digitally signed secure electronic mail; and
forwarding the digitally signed secure electronic mail to an intended recipient.

7. The computer-readable storage device of claim 6, wherein the digital signature is generated based on public key cryptography.

8. The computer-readable storage device of claim 7, wherein the digital signature is generated based on public key cryptography standard seven (PKCS7).

9. The computer-readable storage device of claim 6, wherein forwarding the secure electronic mail to the intended recipient comprises sending the secure electronic mail to a mail server, wherein the mail server includes at least one of a simple mail transfer protocol (SMTP) server and an Internet mail access protocol (IMAP) server, and whereby the mail server recognizes the secure electronic mail as valid.

10. The computer-readable storage device of claim 6,
wherein the electronic mail format that can be digitally signed is a Multipurpose Internet Mail Extensions (MIME) format; and
wherein the secure electronic mail is based on a Secure MIME (S/MIME) format.

11. A method for digitally signing electronic mail that originates from a web browser, comprising:
receiving at a web browser at a client computer content for an electronic mail from a user;
sending the electronic mail content to a remote server, thereby allowing the remote server to format the content into an unsigned electronic mail format that can be digitally signed by the web browser;
receiving, at the web browser, the unsigned electronic mail formatted to be digitally signed from the remote server;
generating a digital signature by the web browser for the received formatted unsigned electronic mail using a cryptographic key stored at the client computer;
transmitting the generated digital signature to the remote server, thereby allowing the remote server to encapsulate the formatted unsigned electronic mail and the digital signature as a digitally signed secure electronic mail and to forward the electronic mail to an intended recipient.

12. The method of claim 11, wherein generation of the digital signature is based on public key cryptography.

13. The method of claim 12, wherein generation of the digital signature is based on public key cryptography standard seven (PKCS7).

14. The method of claim 11,
wherein the electronic mail format that can be digitally signed is a Multipurpose Internet Mail Extensions (MIME) format; and
wherein the secure electronic mail is based on a Secure MIME (S/MIME) format.

15. A computer-readable storage device storing instructions that when executed by a computer cause the computer to perform a method for digitally signing electronic mail that originates from a web browser, the method comprising:
receiving at a web browser at a client computer content for an electronic mail from a user;
sending the electronic mail content to a remote server, thereby allowing the remote server to format the content into an unsigned electronic mail format that can be digitally signed by the web browser;
receiving, at the web browser, the unsigned electronic mail formatted to be digitally signed from the remote server;
generating a digital signature by the web browser for the received formatted unsigned electronic mail using a cryptographic key stored at the client computer;
transmitting the generated digital signature to the remote server, thereby allowing the remote server to encapsulate the formatted unsigned electronic mail and the digital signature as digitally signed a secure electronic mail and to forward the electronic mail to an intended recipient.

16. The computer-readable storage device of claim 15, wherein generation of the digital signature is based on public key cryptography.

17. The computer-readable storage device of claim 16, wherein generation of the digital signature is based on public key cryptography standard seven (PKCS7).

18. The computer-readable storage device of claim 15,
wherein the electronic mail format that can be digitally signed is a Multipurpose Internet Mail Extensions (MIME) format; and
wherein the secure electronic mail is based on a Secure MIME (S/MIME) format.

* * * * *